United States Patent [19]

Winkler et al.

[11] 4,104,664
[45] Aug. 1, 1978

[54] FILM ADVANCE MECHANISM FOR STILL CAMERAS

[75] Inventors: Alfred Winkler, Munich; Peter Lermann, Narring; Dieter Engelsmann; Günter Fauth, both of Unterhaching, all of Fed. Rep. of Germany

[73] Assignee: AGFA-Gevaert, AG, Leverkusen, Fed. Rep. of Germany

[21] Appl. No.: 763,683

[22] Filed: Jan. 28, 1977

[30] Foreign Application Priority Data

Jan. 30, 1976 [DE] Fed. Rep. of Germany ....... 2603661
May 14, 1976 [DE] Fed. Rep. of Germany ....... 2621614

[51] Int. Cl.$^2$ .................... G03B 1/00; G03B 17/04; G03B 17/26
[52] U.S. Cl. .................................. 354/213; 354/187; 354/275
[58] Field of Search ............ 354/354, 202, 187, 275, 354/245, 248, 204–207, 213, 212

[56] References Cited

U.S. PATENT DOCUMENTS

| | | | |
|---|---|---|---|
| 3,741,097 | 6/1973 | Fukuda et al. | 354/212 |
| 3,852,792 | 12/1974 | Nikitsch et al. | 354/206 X |
| 3,864,705 | 2/1975 | Winkler | 354/187 |
| 4,001,849 | 1/1977 | Takahashi | 354/207 |
| 4,032,940 | 6/1977 | Yan Chan | 354/213 X |

Primary Examiner—Donald A. Griffin
Attorney, Agent, or Firm—Michael J. Striker

[57] ABSTRACT

A still camera has a housing adapted to hold a roll of film having a succession of frames. An openable shutter is provided on the housing alignable with the film and a takeup wheel in the housing is connectable to the roll of film and rotatable to wind the film up and displace the frames one-by-one past the shutter. A film-advance slide is displaceable on the housing between a pulled-out position projecting from the housing and a pushed-in position fitting snugly with the housing. A transmission and a one-way coupling are provided in the housing between the slide and the take-up wheel so that the take-up wheel is rotated to wind up the film only on displacement of the slide from the pushed-in position to the pulled-out position. Furthermore, a frame-sensing mechanism in the camera arrests displacement of the slide or a portion of the slide in the direction toward the pulled-out position when a fresh frame is properly aligned with the shutter.

15 Claims, 7 Drawing Figures

4,104,664

FILM ADVANCE MECHANISM FOR STILL CAMERAS

BACKGROUND OF THE INVENTION

The present invention relates to a still camera. More particularly this invention concerns such a camera having a pullout slide actuatable to advance the film within the camera.

A still camera is known wherein a film having a succession of frames is advanced stepwise or frame-by-frame past a shutter on actuation of a film-advance slide. This slide normally is moved for each incremental advance of the film relative to the camera housing, normally from a pushed-in position lying snugly against the housing to a pulled-out position projecting from the housing. A rack provided on or formed on this slide normally is connected to a takeup spool or wheel through a transmission or coupling arranged in such a manner that the travel of the slide relative to the camera housing between its end positions is directly proportional to the amount of film wound up by the takeup wheel.

Normally it is impossible to use in such an arrangement a so-called feeler and lockout arrangement which insures that once a frame of the film is properly aligned with the camera shutter film advance is stopped. Such mechanism cannot be provided either because the film must be displaced relative to the camera housing on displacement of the slide and the slide itself must be displaceable from its pulled-out position which corresponds to the ready position of the camera back into its pushed-in position for taking a picture, or because it is necessary that the slider move the same distance each time it advances a frame. Thus it is normally necessary to provide a planetary gearing arrangement between the slider and the film takeup wheel so as to allow the slide to move all the way into the desired pulled-out position or back into the pushed-in position. It is noted that as the film is wound up on the takeup spool the effective diameter of this spool increases so that it does not have to be rotated as much to take up a single frame as when this spool is empty and its effective diameter is smaller.

Another disadvantage of most of the known cameras of the above-described types is that they are relatively complex, containing considerable gearing. Thus, they are expensive to produce and failure-prone.

SUMMARY OF THE INVENTION

It is therefore an object of the present invention to provide an improved still camera.

Another object of this invention is to provide an improved film-advance mechanism for a still camera having a slide operated to advance the frames of the film one-by-one past the camera shutter.

These objects are attained according to the present invention in the use in a camera of a frame-sensing mechanism which comprises a sensor adapted to feel the perforation formed in a conventional roll of film at each frame. This is connected in accordance with the present invention to the film-advance slide in such a manner that displacement of the slide or a portion thereof is stopped when a fresh frame is aligned with the shutter after the previous frame has been exposed. It is noted that each time the shutter is opened in such a camera the sensor which has a finger projecting into the hole of the frame being exposed is pulled from this hole and only serves to stop the slide and the film advance when the perforation of the next fresh frame of the film is aligned with the shutter.

Thus in accordance with the present invention it is possible at relatively small expense to produce a camera which operates with the desired pullout film-advance slide, yet which automatically stops the film advance each time a fresh frame is aligned with the camera shutter.

According to further features of this invention means is provided in the housing including a transmission and a one-way coupling between the slide and the film takeup wheel for rotating this wheel and winding up the film on displacement of the slide from the pushed-in position toward the pulled-out position. The frame-sensing mechanism is provided in the housing engageable with the film, connected to the camera shutter, and connected to the transmission for arresting the slide and the film each time a fresh frame or film is aligned with the shutter and for freeing the slide for movement after opening of the shutter and exposing of the fresh frame.

The film transport arrangement according to the present invention has the advantage that while being relatively inexpensive it gives good operating ease and comfort of use. Thus it is possible to form cameras in accordance with this invention which can be operated, that is whose shutters can be opened, both in the pulled-out position of the slider after advancing of a frame as well as in the pushed-in position. It is also possible to provide a spring means in accordance with this invention to return the slide automatically to the pushed-in position so that the camera has the same overall length when used no matter how far it is necessary to displace the slider in order to advance a full frame into line with the shutter. Indeed it is even possible with this invention to pump the slider twice in order to move the frame into position if necessary.

According to another feature of this invention the transmission between the slide and the takeup wheel of the camera includes at least one toothed coupling wheel or gear whose pivot axle is displaceable in a slot formed in the housing so that this wheel is displaceable between a coupling position in which the slide and takeup wheel of the film are interconnected by a series of intermeshing teeth so that movement of the slide will rotate the takeup wheel, and a decoupling position wherein movement of the slide is not transmitted to the film takeup wheel. This slot in which the axle of the coupling wheel is slidable is oriented in direction that is substantially the same as the direction in which force is exerted against this movable gear wheel by the other wheels of the arrangement on displacement of the rack formed on or connected to the slide on displacement of the slide against the film transport direction, that is displacement of the slide from the pulled-out position to the pushed-in position. Thus this gear wheel itself forms part of the above-mentioned one-way coupling, greatly simplifying the structure of the arrangement and similarly reducing the cost of a camera so equipped.

According to further features of this invention the camera housing is formed to hold a cassette of film, by which is meant a closed normally synthetic-resin container carrying before use a relatively empty takeup reel and a full payout reel separated at a window arranged to be aligned with the camera shutter. The film itself is formed at each frame with a perforation that can be sensed by the finger of the above-mentioned frame-sensing mechanism to arrest the slide and film advance when a fresh frame is aligned with the shutter.

The rack of the slide according to this invention may be formed directly on the slide and mesh with a wheel pivotal on the housing and connected via a pawl-type one-way coupling to the first gear of a gear train constituting the transmission and terminating at the gear formed on the take-up spool of the film cassette. It is also possible to form the rack on a separate bar coupled for longitudinal displacement with the slide, but nonetheless longitudinally displaceable relative to the slide so that once the fresh frame is aligned with the shutter this bar itself will be arrested but the slide can still move into the pulled-out position.

In accordance with yet another feature of this invention the viewfinder is provided directly on the slide. The camera is provided with several bars all of which are displaced during a picture-taking operation, with one bar striking a piezoelectric element serving to energize a flashbulb, and another slidable element which serves to open the shutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

SPECIFIC DESCRIPTION OF PREFERRED EMBODIMENTS

Figure 1:
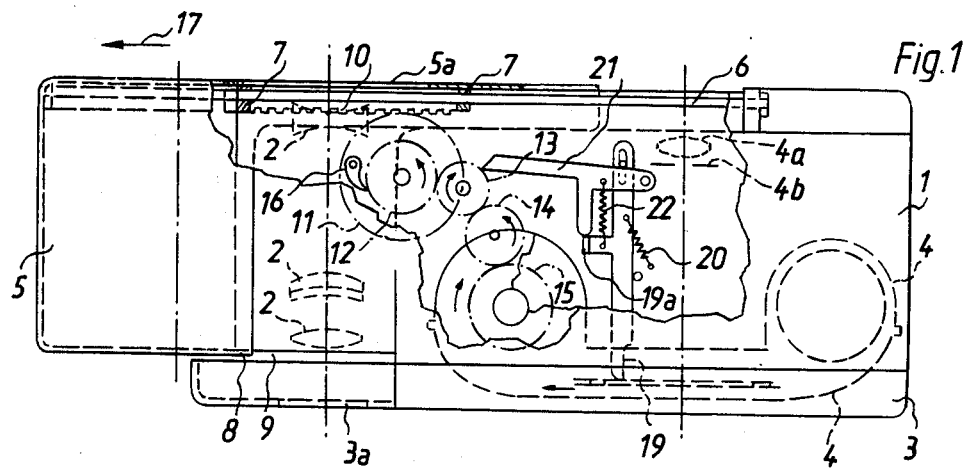
FIG. 1 is a top view partly broken away of a first embodiment of a camera according to this invention.

The embodiment of FIG. 1 has camera housing 1 provided with a viewfinder lens system 2, a cover 3 for a cassette or film chamber, a film cassette 4, and a film-advance slide 5. This film-advance slide 5, which also serves for cocking the shutter and similar devices of the camera, is slidable over the camera housing 1. Thus various windows 5a, 5b, and 5c in the slide 5 can be aligned with the viewfinder 2 and the camera lens 4a provided directly in front of the shutter 4b. The slide 5 is L-shaped with its one leg formed of U-profile and slidable along the front face of the camera over the objective lens 4a and its second leg fitting as a cap over one narrow end of the camera.

In order to minimize the force necessary to displace the slide 5 there is provided on the front of the housing 1 or on the slide 5 a guide rod 6 on which slide eyes 7 of the other element. Here the eyes 7 are provided on the housing 1 and the rod 6 is fixed to the slide 5. Toward the back of the camera housing 1, that is the lower side as shown in FIG. 1, the slide 5 has a web 8 fitting within a slot 9 in the housing 1 so that displacement of the slide 5 is possible with minimal friction. The cover 3 is provided with a window 3a through which the user looks to employ the viewfinder 2.

The slide 5 is here formed unitarily with a rack 10 of gear teeth extending in the direction of displacement of the slide 5 on the housing 1 as indicated by arrow 17. A first gear wheel 11 pivoted on the housing 1 meshes at all times with this rack 10 and is connectable via a one-way coupling pawl 16 to the first gear 12 connected through a second gear 13 and a fourth gear 14 constituting a gear train 12–14 to a gear 15 provided on the takeup spool of the film cassette 4. The gear 12 has sawtooth-shaped teeth and the pawl 16 is urged inwardly so that only on displacement of the slide 5 in the direction indicated by arrow 17 are the wheels 11 and 12 coupled together, displacement in the direction opposite to arrow 17 will therefore cause the wheel 11 to rotate relative to the wheel 12. Thus as the slide 5 is moved outwardly in the direction of arrow 17 the film 18 in the cassette 4 (see FIG. 2) is wound from the payout spool located at the right as shown in FIG. 1 to the takeup spool having gear 15.

The film 18 is constituted as a flexible sheet or foil formed at each of its frames with a throughgoing hole in which can engage a finger 19 of a frame-sensing mechanism. This finger 19 is limitedly pivotal on the housing 1 and is urged toward the film 18 by means of a spring 20. In addition the element 19 has a lateral arm 19a that can engage under a braking element 21 pivoted on the housing 1 and displaceable from the nonbraking position shown in FIG. 1 to a braking position in which its tip engages in the teeth of the middle gear 13 of the gear train 12–14. A spring 22 biases the element 21 into the braking position.

As mentioned above displacement of the slide 5 in the direction of arrow 17 causes the film 18 to wind up on its takeup spool. When, however, a frame-indicating aperture in the film 18 aligns with the element 19 this element 19 will drop down and allow the element 21 to move into the braking position in which it prevents rotation of the gear wheel 13 in the direction necessary to advance the film back along behind the shutter 4b. The film 18 does, however, move somewhat after the element 19 engages in the aperture in it so that not only can the tip of the element 19 drop through the hole, but the entire element 19 is swung somewhat to the side so that the end 19a is thoroughly disengaged from the braking element 21. When the shutter 4b is opened and closed to expose the fresh frame exposed between the payout and takeup spools of the cassette 4 the element 19 is pulled out of the aperture in the film 18 and back into the illustrated position immediately behind this aperture, thereby simultaneously pushing the element 21 up into the illustrated nonbraking position so that once again the film can be advanced.

The slide 5 cannot move outwardly further once the above-described braking operation is effected. Thus once a fresh frame is aligned behind the shutter 4b outward displacement of the slide 5 in the direction of arrow 17 is impeded due to arresting of the wheel 13. In this pulled-out position the relatively large aperture 5a will nonetheless be aligned with the viewfinder 2 so that it is possible to take a picture with the camera. This aperture 5a is so dimensioned in FIG. 1 that it is aligned with the viewfinder 2 when the takeup spool carrying the wheel 15 is full or empty, as when the takeup spool is relatively full only a small displacement of the slide 5 will be needed to move a new frame into position.

Figure 2:
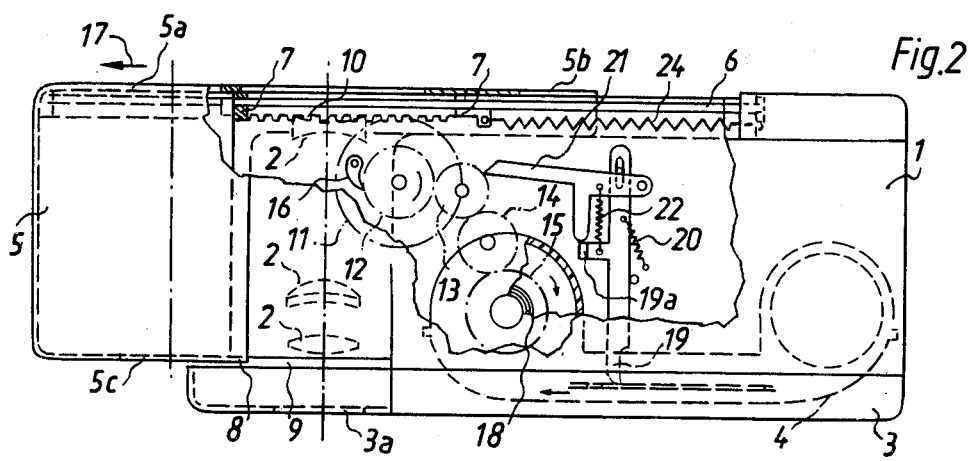
FIG. 2 is a view similar to FIG. 1 showing a second embodiment of the camera according to this invention, with the takeup spool for the film empty.
Figure 3:
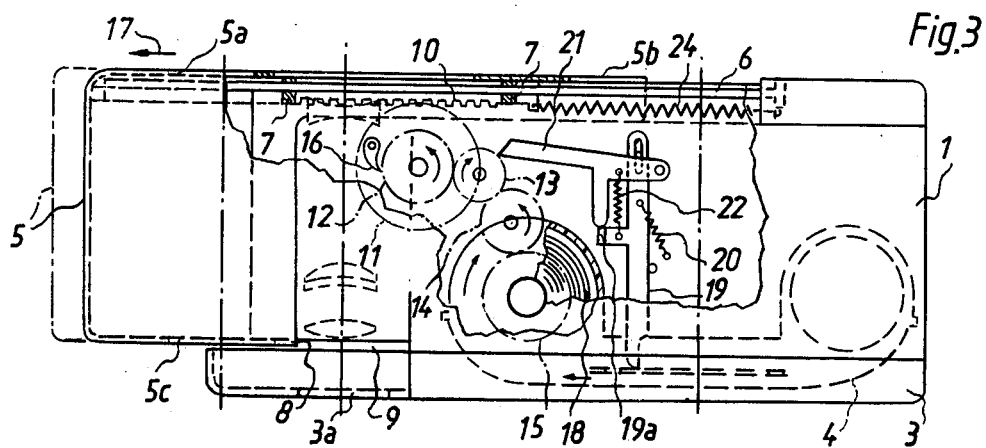
FIG. 3 is a view similar to FIG. 2 showing the camera with a full takeup spool.

Structure in FIGS. 2 and 3 identical to that in FIG. 1 bears the same reference numerals. In this arrangement there is provided a return spring 24 which is connected to the slide 5 at its rack 10 and it normally pulls the slide 5 back into the pushed-in position. In addition the various apertures 5a, 5b, and 5c of this camera are so positioned that when the slide 5 is in the pushed-in position the apertures 5a and 5c are aligned with the viewfinder 2 and the aperture 5b is aligned with the lens 4a. Thus the user can take a picture when the slide 5 is in the pushed-in position, a position to which it is automatically returned by the spring 24.

Figure 4:
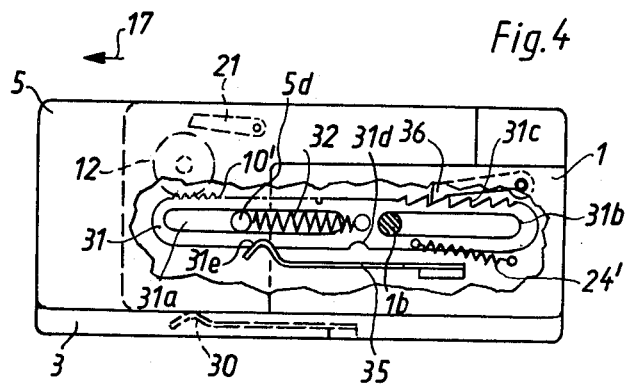
FIGS. 4–6 are partly broken-away views of another camera according to this invention with its slide shown in the pushed-in position, the pulled-out position with a full takeup spool, and the pulled-out position with an empty takeup spool, respectively.
Figure 5:
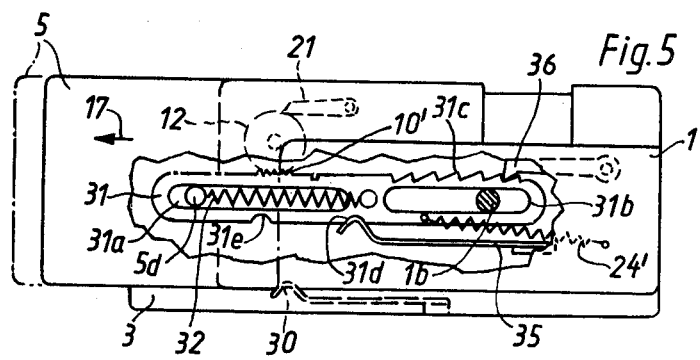
Figure 6:
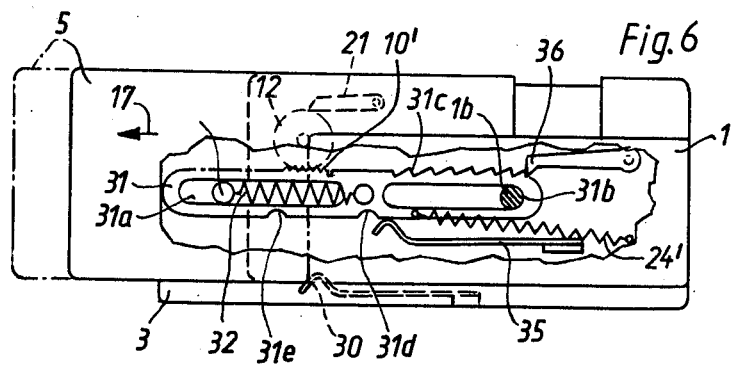

In the third embodiment shown in FIGS. 4–6 structure functionally identical to the structure of FIGS. 1–3 bears the same reference numerals. Here, however, the slide 5 is constituted in part by a link 31 formed with a pair of in-line slots 31a and 31b extending in the direction of displacement of the slide 5 relative to the housing 1. In addition this link 31 is formed along its upper edge with a plurality of ratchet-type sawteeth 31c and on its lower edge with two longitudinally spaced indentations 31d and 31e. A leaf spring 35 mounted on the housing 1 has an end engageable in either of these depressions 31d or 31e so as to hold the link 31 in either of the two positions illustrated in FIGS. 4 and 5.

The slide 5 in this arrangement is provided with a pin 5d extending through the slot 31a and connected via a spring 32 to the link 31. In addition a pin 1b carried on the housing 1 extends through the slot 31b, and a spring 24' extends between the housing 1 and the link 31. The springs 24' and 32 urge the link 31 with a relatively light force toward the right, that is into the pushed-in position of the slide 31. Finally, a ratchet pawl 36 is pivoted on the housing 1 and engageable with the sawteeth 31c so as to allow this link 31 to move to the left as shown in FIGS. 4–6 but to impede its displacement toward the right. The housing 1 is also provided with another leaf spring 30 that has a rounded end engageable behind the edge of the slide 5 in the intermediate position shown in FIG. 5 so as to hold the slide 5 in this intermediate position.

At the beginning of a film advance the slide 5 is moved from the pushed-in position of FIG. 4 in the direction of arrow 17 so as at first to tension the spring 32. To this end the spring force in spring 32 is not sufficient to overcome the spring force of spring 35. Finally the pin 5d will come to rest in the left-hand end of the slot 31a, whereupon further displacement of the slide 5 in the direction of arrow 17 will move the link 31 in the direction of arrow 17, with the spring 35 slipping out of the recess 31e. Meanwhile, of course, film is being wound from the payout to the takeup spool in the camera.

The brake element 21 finally drops down onto the wheel 12 or the wheel 13 as the mechanism described with reference to FIGS. 1–3 senses that a fresh frame is aligned behind the camera shutter. It is noted that the upper edge of the link 31 is formed with a rack 10' which meshes with the wheel 12, so that displacement of this link 31 further in the direction of arrow 17 is blocked once a fresh frame is aligned with this shutter.

If in this position, indicated in dot-dash lines in FIGS. 5 and 6, the slide 5 is released the spring 32 will pull it back into the solid-line position of FIGS. 5 and 6, with the edge of the slide 5 resting on the end of the spring 30. In this intermediate position it is possible for the user to take a picture. It is possible to push the slider 5 back over the spring 30 into the pushed-in position without taking a picture, but with the link 31 remaining in the illustrated position, held there by the one-way coupling constituted by the pawl 36 and teeth 31c.

When the shutter of the camera is released, in addition to the element 21 being pulled away from the gear train 12–14, the pawl 36 is also pivoted up. This will cause the link 31 to move back into the starting position of FIG. 4, as the spring 24 is sufficiently strong to move the link 31 against the force of the holding spring 35.

Thus, with the camera according to FIGS. 4–6 the same film advance is obtained using the slide 5, but it is possible to return the slide 5 to the pushed-in position without taking a picture, and to pull it out again to the pulled-out position in order to take a picture thereafter. This allows the slide 5 to move over and protect the lens of the camera as well as to block the shutter release so that once the slide 5 is pushed in the camera, even with its shutter cocked, can be dropped into a pocket without fear of accidentally actuating the shutter release. At the same time as shown in FIGS. 5 and 6 the pulled-out position to which the element normally returns, and which is defined by the spring 30, is closer to the pushed-in position than either of the dot-dash positions of FIGS. 5 and 6 corresponding to the displacement necessary for advancing a new frame into position with a relatively full takeup spool and with a relatively empty takeup spool, respectively.

Of course, various modifications of the three embodiments described above are also possible. For instance the locking arrangement and in particular the braking element 21 can be operated either fully or completely by rotation of a sprocket wheel, or the elements 19 and 21 could be unitary. It is also possible to use a slide 5 that is not L-shaped, which merely constitutes a cap fitting over the end of the housing and which is slidable on the housing by means of guides constituted by various rods and eyes as described above.

Figure 7:
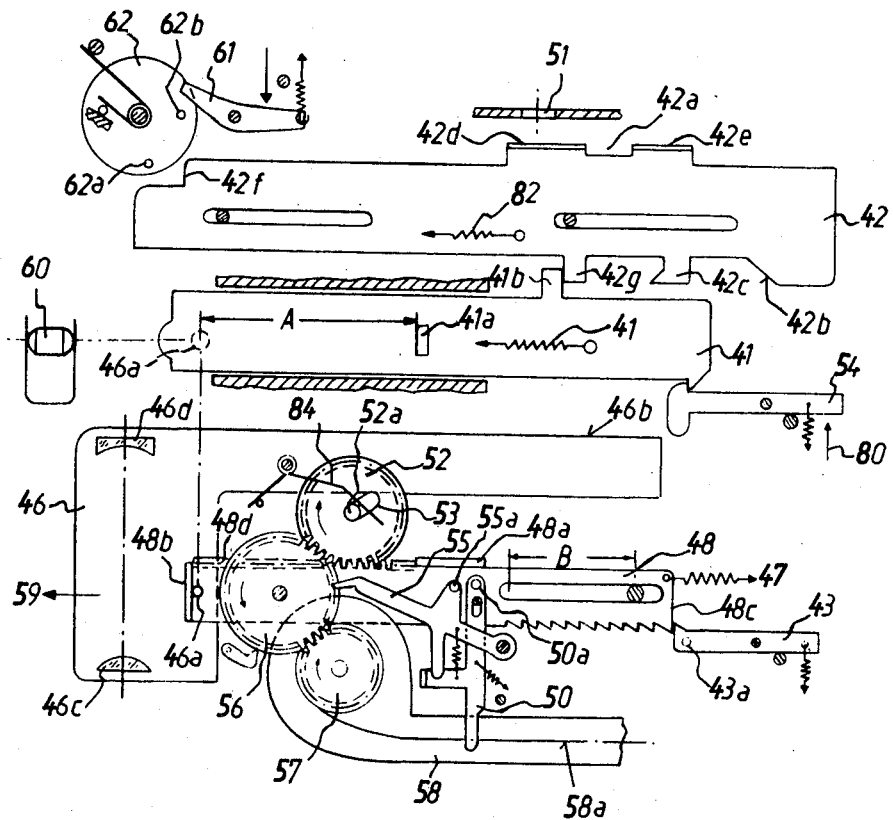
FIG. 7 is a largely diagrammatic view of a fourth embodiment of the camera according to this invention.

In FIG. 7 a camera is shown having four principal operating elements, a shutter plate 42, an impact plate 41, a slide 46, and a link or film-advance plate 48. These elements are shown next to one another for clarity of view, it being noted that in reality for most compact assembly these elements are stacked or superposed with one another.

The slide 46 in this arrangement is generally L-shaped and has a leg 46d that normally extends along the front of the camera and, when in the pushed-in position, covers a shutter aperture 51a in the front of the camera housing. This slide 46 is displaceable in a direction 59 away from the camera housing and is provided on its outer end with a pair of lenses 46c and 46d constituting the viewfinder and usable when the slide 46 is in the illustrated pulled-out position.

In this arrangement a standard film 58a is held in a cassette 58 and can be wound up on a takeup spool formed in part as a gear 57 that meshes constantly with an intermediate gear 56. The link plate 48 is formed with a rack 48d normally meshing with the teeth of a first gear wheel 52 that can also mesh with the gear wheel 56. This wheel 52 is unitarily formed with a central pivot axle that fits within an elongated slot or hole 53 formed in the camera housing. A relatively weak return spring 84 mounted on the slide 46 bears against the axle 52a and normally urges the gear wheel 52 into a position meshing both with the gear 56 and with the rack 48d so as to couple these two elements together.

The slide 46 is provided with a pin 46a that engages behind a bent-up tab 48b of the link plate 48 so that when the slide 46 is displaced in direction 59 the pin 46 engages behind the bent-up tab 48b and pulls the plate 48 in this direction. During such motion the gear wheel 52 will be rotated while in mesh with the gear wheel 56 so as to wind up a frame of the film in the manner described above with reference to FIGS. 1-6. A film-sensing finger 50 is connected with a braking element 55 that serves to arrest rotation of the gear 56 when a fresh frame is aligned with the shutter opening 51, again substantially as described above. Such arresting by means of the element 55 also stops displacement of the slide 46 in the direction 59.

The shutter plate 42 has a pair of bent-up tabs 42d and 42e which flank and define a slot 42a alignable with the shutter aperture 51. A spring 82 normally urges the shutter plate 42 to the left, that is in the direction 59. At its left-hand end edge 42f there is provided an inertial disk 62 carrying two pins 62a and 62b. When a flash bulb is inserted in the camera a lever 61 is depressed as shown in FIG. 7 so that the pin 62a lies in the path of the edge 42f. When the flash bulb is removed the lever 61 swings up so as to rotate the inertial disk 62 and move the pin 62a out of the path of the edge 42f. Thus the exposure time will be slowed down by striking of the edge 42f against the pin 62a when a flash bulb is in the camera, but will be considerably faster when the flash bulb has been removed.

In addition the camera has a shutter release 54 which is normally biased by spring 80 and serves to hold the impact plate 41 in a withdrawn position spaced from a piezoelectric crystal 60 and in turn holding back the shutter plate 42 by interengagement of tabs 41b and 42g on the elements 41 and 42 respectively.

The link plate 48 is formed on one edge with a plurality of sawteeth terminating at an end 48c against which can engage a locking pawl 43 which serves to hold the link plate 48 in the illustrated pulled-out position. The shutter plate 42 is provided with a camming surface 42b that can engage a pin 43a on the pawl 43, and is further provided with a formation 42c which can engage pins 50a and 55a on the elements 50 and 55 respectively.

Thus when the shutter release 54 is pressed upwardly in its actuation direction 80 will allow the plate 41 to move to the left under the force of its spring 81, thereby simultaneously allowing the spring 82 to pull the plate 42 to the left. Travel of the plate 42 to the left causes momentary registration of the slot 42a with the hole 51 for exposure of the film 58a for a time dependent on whether or not a flash bulb is inserted in the camera as described above, the exposure time being increased with the flash bulb. Furthermore as the plate 42 travels to the right it first of all cams the end of the pawl 43 down away from the end 48c of the pawl 48 and allows the return spring 47 for the plate 48 to move the plate 48 backwardly through a distance B. In addition the formation 42c will lift the pins 50a and 55a and disengage the feeler 40 from the frame-indicating hole in the film 28a and pull the element 55 from the gear 26 so as to allow the system again to be cocked. The impact plate 41 will strike the crystal 60 with considerable force and cause it to generate sufficient electricity to fire a flash bulb fitted in the camera if necessary.

In order to cock the camera after pulling-out of the slide 46 this slide 46 is merely pushed in through a distance A. This causes the pin 46a to engage a tab 41a on the plate 41 and push this plate 41 back until it is caught by the shutter release 54. Such pushing-back of the plate 41 also pushes back the plate 42 as the tab 41b engages the tab 42g. During this time the plate 48 has, of course, been returned to its starting position so that a tab 48a on this plate 48 is aligned with the shutter aperture 51. Thus as the slot 42a is displaced back past this shutter aperture 51 a double exposure is avoided.

Thus in use the user pulls out the slide 46 until it moves no longer, indicating that the fresh frame or film is aligned with the aperture 51. The picture can then be taken simply by actuating the shutter release 54 as the user views the object being photographed through the viewfinder 46c, 46d. Operation of the shutter release 54, as described above, moves the plates 41 and 42 to the left while allowing the plate 48 to return to the right.

After the picture is taken the slide 46 is pushed in again so as to push the plates 41 and 42 back into their indicated starting positions against the force of their respective springs 81 and 82. When the slide 46 is in the pushed-in position the shutter release 54 cannot be operated. Thereafter pulling-out of the slide 46 again advances a new frame into alignment with the shutter aperture 51 so that another picture can be taken.

As the slide 46 is pushed in it urges the gear 52 toward the right as seen in FIG. 7 so that the pin 52a travels along the slot 53 against the force of spring 84 and the gear 52 disengages from the gear 56 and the rack 48d. Thus reverse-winding of the film 58a is eliminated. Such an arrangement allows the user to take pictures one after the other in rapid succession. Each time the slide is pulled out a new frame is aligned with the shutter opening 51 and each time it is pushed in the impact plate 41 and shutter plate 42 are cocked. Since half of the functions are performed in each direction operation of the slide is very simple. Furthermore, once the camera is cocked and ready to fire, with the slide 46 in the pulled-out position, it is possible for the user simply to push the slide 46 back into the pushed-in position should he or she decide not to take a picture. Thereafter the slide 46 can be pulled back out into the pulled-out position without any changing of the position of the various elements, as the link plate 48 will remain in the pulled-out position even when the slide 46 is pushed back in.

It will be understood that each of the elements described above, or two or more together, may also find a useful application in other types of apparatus differing from the types described above.

While the invention has been illustrated and described as embodied in a cassette-type still camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A still camera comprising a housing adapted to hold a roll of film having a succession of frames; an openable shutter on said housing alignable with said film; a takeup wheel in said housing connectable to said roll of film and rotatable to wind up the same and displace said frames one-by-one past said shutter; a film-advance slide displaceable on said housing between a pulled-out position projecting from said housing and a pushed-in position fitting snugly with said housing; means in said housing including a transmission and a one-way coupling between said slide and said takeup wheel for rotating the same and winding up said film on displacement of said slide from said pushed-in position toward said pulled-out position; and means in said housing engageable with said film, connected to said shutter, and connected to said transmission for arresting said slide and said film each time a fresh frame of said film is aligned with said shutter and for freeing said slide for movement after opening of said shutter and exposure of the fresh frame, said film including a takeup spool connected to said takeup wheel and said slide being displaceable between its said positions through a straight-line distance correspondingly proportionally to at least the maximum film advance necessary to displace a fresh frame of said film into alignment with said shutter when said takeup spool is relatively empty, said housing being provided with spring means for holding said slide in a position intermediate said pulled-out and pushed-in positions and spaced from said pushed-in position by a straight-line distance proportionately equal to the displacement necessary when said takeup spool is relatively full.

2. The camera defined in claim 1, wherein said transmission includes a gear train including a plurality of meshing rotary gears between said coupling and said takeup wheel, said one-way coupling having one side connected to said gear train and another side operatively connected to said slide, said one side is first gear wheel rotatable on said housing, said slide carrying a rack meshing with said first gear wheel, said means for arresting said slide including an element brakingly engageable with one of said gears of said train, and said one-way coupling including a pivotal pawl carried on said first gear wheel and engageable with said gear train.

3. A still camera comprising a housing adapted to hold a roll of film having a succession of frames; an openable shutter on said housing alignable with said film; a takeup wheel in said housing connectable to said roll of film and rotatable to wind up same and displace said frames one-by-one past said shutter; a film-advance slide displaceable on said housing between a pulled-out position projecting from said housing and a pushed-in position fitting snugly with said housing; means in said housing including a transmission and a one-way coupling between said slide and said takeup wheel for rotating same and winding up said film on displacement of said slide from said pushed-in position toward said pulled-out position; and means in said housing engageable with said film, connected to said shutter, and connected to said transmission for arresting said slide and said film each time a fresh frame of said film is aligned with said shutter and for freeing said slide for movement after opening of said shutter and exposure of the fresh frame, said slide including a link formed with a pair of in-line slots extending in the direction of displacement of said slide on said housing, said slide having a slide pin extending into one of said slots and a slide spring between said link and said slide, said housing having a housing pin extending into the other of said slots and a housing spring between said housing and said link, said link being formed with a rack constituting part of said means including said transmission.

4. The camera defined in claim 3 wherein said link is formed with a row of teeth and said housing is provided with a pawl engageable with said teeth and displaceable between a ratcheting position engaging said teeth and only allowing displacement of said link in a direction corresponding to displacement of said slide from said pushed-in position into said pulled-out position and a nonratcheting position allowing displacement of said link in said direction and in the opposite direction, said pawl being coupled to said shutter.

5. A still camera comprising a housing adapted to hold a roll of film having a succession of frames; an openable shutter on said housing alignable with said film; a takeup wheel in said housing connectable to said roll of film and rotatable to wind up same and displace said frames one-by one past said shutter; a film-advance slide displaceable on said housing between a pulled-out position projecting from said housing and a pushed-in position fitting snugly with said housing; means in said housing including a transmission and a one-way coupling between said slide and said takeup wheel for rotating same and winding up said film on displacement of said slide from said pushed-in position toward said pulled-out position; and means in said housing engageable with said film, connected to said shutter, and connected to said transmission for arresting said slide and said film each time a fresh frame of said film is aligned with said shutter and for freeing said slide for movement after opening of said shutter and exposure of the fresh frame, said transmission including a first gear wheel and said slide being provided with a rack, said one-way coupling including a coupling gear wheel having a pivot axis, said housing being formed with an elongated slot receiving said axle, said axle being displaceable in said slot between a coupling position meshing with both said first gear wheel and with said rack and a decoupling position out of mesh with at least said first gear wheel.

6. The camera defined in claim 5 wherein said slot is elongated generally in the direction of displacement of said slide on said housing, said first gear wheel being provided generally to the end of said slot in such a manner that said axle is urged away from said first gear wheel on displacement of said slide from said pulled-out position toward said pushed-in position.

7. The camera defined in claim 6, further comprising a weak return spring normally biasing said coupling gear wheel into said coupling position.

8. The camera defined in claim 6 wherein said slide includes a link plate having said rack, said camera further comprising a row of sawteeth on said plate and a pawl on said housing engageable with said sawteeth in a ratcheting position for displacement of said link plate in a direction corresponding to displacement of said slide from said pushed-in to said pulled-out position, and a nonratcheting position allowing free sliding of said plate in the opposite direction, said plate and said slide being formed with formations engageable on displacement of said slide from said pushed-in position toward said pulled position, whereby when said slide is pulled out said formations engage to pull out said link plate which is arrested in its pulled-out position by said pawl until said shutter is opened, said camera further including a spring continuously biasing said link plate in said opposite direction.

9. In a still camera having a housing a shutter and means for receiving a roll of film in said housing, a film advance device comprising, in combination, a hand operated film advance slide movable in two opposite positions, film takeup means coupled to said slide and to said film for advancing said film in one direction and for blocking the same in opposite direction; film advance control means coupled to said takeup means and to said shutter for blocking the advance of said film after a predetermined frame distance and for unblocking the film in response to the shutter actuation; and first spring means for returning and releasably arresting independently from said film advance control means said slide in a predetermined pulled-out position thereof corresponding to said frame distance.

10. The camera defined in claim 9 further comprising a guide on said housing, said slide being displaceable along said guide.

11. The camera defined in claim 9 wherein said film is formed at each of said frames with a through-going frame-indicating aperture, said film-advance control means including a sensing finger engageable through said apertures and a braking element connected to said finger and blockingly engageable with said transmission.

12. The camera as defined in claim 9, wherein said first spring means includes a leaf spring secured on said housing and detachably engaging said slide in said predetermined position.

13. The camera as defined in claim 9; further comprising a slidable link disposed between said slide and said housing, means for guiding said link in two opposite directions, means for coupling said link between said film takeup means and said slide to transfer the movement of said slide in the film advance direction to said film takeup means, and second spring means for returning and releasably arresting said link, independently from said film advance control means, in a predetermined position corresponding to the advance of the film about said frame distance.

14. The camera as defined in claim 13, wherein said second spring means includes a leaf spring secured to said housing and releasably engaging said link in said predetermined position.

15. The camera as defined in claim 13; further comprising unidirectional blocking means coupled between said link and said housing for blocking within the range of one frame the movement of said link in the direction opposite to the film advance and for unblocking said movement when the film advance exceeds said range of one frame; and means for disengaging said blocking means in response to the shutter release.

* * * * *